(12) United States Patent
Earl et al.

(10) Patent No.: US 10,402,374 B2
(45) Date of Patent: Sep. 3, 2019

(54) LOG-STRUCTURED STORAGE DEVICE FORMAT

(71) Applicant: VMware, Inc., Palo Alto, CA (US)

(72) Inventors: William Earl, Boulder Creek, CA (US); Christos Karamanolis, Los Gatos, CA (US); Kiran Joshi, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 505 days.

(21) Appl. No.: 14/469,418

(22) Filed: Aug. 26, 2014

(65) Prior Publication Data

US 2015/0058291 A1   Feb. 26, 2015

Related U.S. Application Data

(60) Provisional application No. 61/870,161, filed on Aug. 26, 2013.

(51) Int. Cl.
*G06F 11/14* (2006.01)
*G06F 16/17* (2019.01)

(52) U.S. Cl.
CPC ...... *G06F 16/1734* (2019.01); *G06F 11/1471* (2013.01)

(58) Field of Classification Search
CPC ........... G06F 17/30144; G06F 16/1734; G06F 11/1471
USPC ........................................ 707/640, 625, 648
See application file for complete search history.

(56) References Cited

U.S. PATENT DOCUMENTS

| | | | | |
|---|---|---|---|---|
| 7,433,898 B1* | 10/2008 | Georgiev | ............ | G06F 11/203 711/163 |
| 7,515,600 B1* | 4/2009 | Savage | .................. | H04L 45/02 370/426 |
| 7,657,578 B1* | 2/2010 | Karr | .................... | G06F 11/2069 707/610 |
| 7,664,991 B1* | 2/2010 | Gunda | ............... | G06F 11/1443 714/43 |
| 7,690,000 B2* | 3/2010 | Farmer | ................ | G06F 16/283 719/318 |
| 2003/0061565 A1* | 3/2003 | Brendle | ............ | G06F 16/9574 715/206 |
| 2005/0165865 A1* | 7/2005 | Farmer | ................ | G06F 16/283 707/E17.005 |
| 2009/0116496 A1* | 5/2009 | Savage | .................. | H04L 45/02 370/400 |
| 2011/0191522 A1* | 8/2011 | Condict | ............... | G06F 12/123 711/103 |
| 2013/0014104 A1* | 1/2013 | Natanzon | ........... | G06F 9/45558 718/1 |

* cited by examiner

*Primary Examiner* — Phong H Nguyen
(74) *Attorney, Agent, or Firm* — Patterson + Sheridan, LLP

(57) ABSTRACT

Embodiments of the disclosure provide techniques managing a log-structured solid state drive (SSD) format in a distributed storage system. SSDs in the distributed storage system maintains a journal of logical changes to storage objects to persist prepared and committed changes in the latency path. The journal includes metadata entries that describe changes and reference data pages. Dense data structures (such as a logical block addressing table) index the metadata entries. To reduce the amount of overhead in I/O operations, the distributed storage system maintains the dense data structures in memory rather than on disk.

20 Claims, 9 Drawing Sheets

LOG-STRUCTURED STORAGE DEVICE FORMAT

CROSS-REFERENCE TO RELATED APPLICATION(S)

This application claims the benefit of U.S. Provisional Application No. 61/870,161, filed Aug. 26, 2013.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output operations per second or IOPS capabilities, etc.), usage of such shared local disks to store virtual disks or portions thereof may be distributed among the virtual machines based on the needs of each given virtual machine. This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure.

Some distributed storage systems are object-based. For example, storage objects use multiple resource characteristics of disks in the cluster, such as IOPS (input/output operations per second) and capacity of solid state disks and magnetic disks to provide storage to clients (e.g., virtual machines). Therefore, efficient use of the disks is an important concern. One issue related to efficient disk usage is minimizing write amplification in solid state disk drives. As is known, write amplification is an undesirable phenomenon associated with SSDs where the actual amount of physical information written is a multiple of the logical amount intended to be written. Because SSD blocks must be erased before being rewritten, the process to perform these operations results in moving data and metadata more than once. Doing so creates a large amount of write overhead in disks with a high rate of I/O operations, resulting in overall slower write operations. In addition, because SSDs have a finite amount of write operations, a high amount of write amplification decreases the lifespan of a SSD.

SUMMARY

One embodiments disclosed herein includes a method for populating journal entries of a storage device (e.g., solid state drive (SSD)) residing in a host computer node of a distributed resources system. Upon an operating occurring on the storage device, a current entry corresponding to the operation is inserted into a journal. The journal maintains entries reflecting logical changes to resource objects in the storage device. Each entry includes a metadata record specifying a change to one or more of the logical changes to the resource objects. Upon determining a type of the metadata record of the current entry, the metadata record is inserted into a data store corresponding to the journal and the type. The data store resides in memory of a host computer system node.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
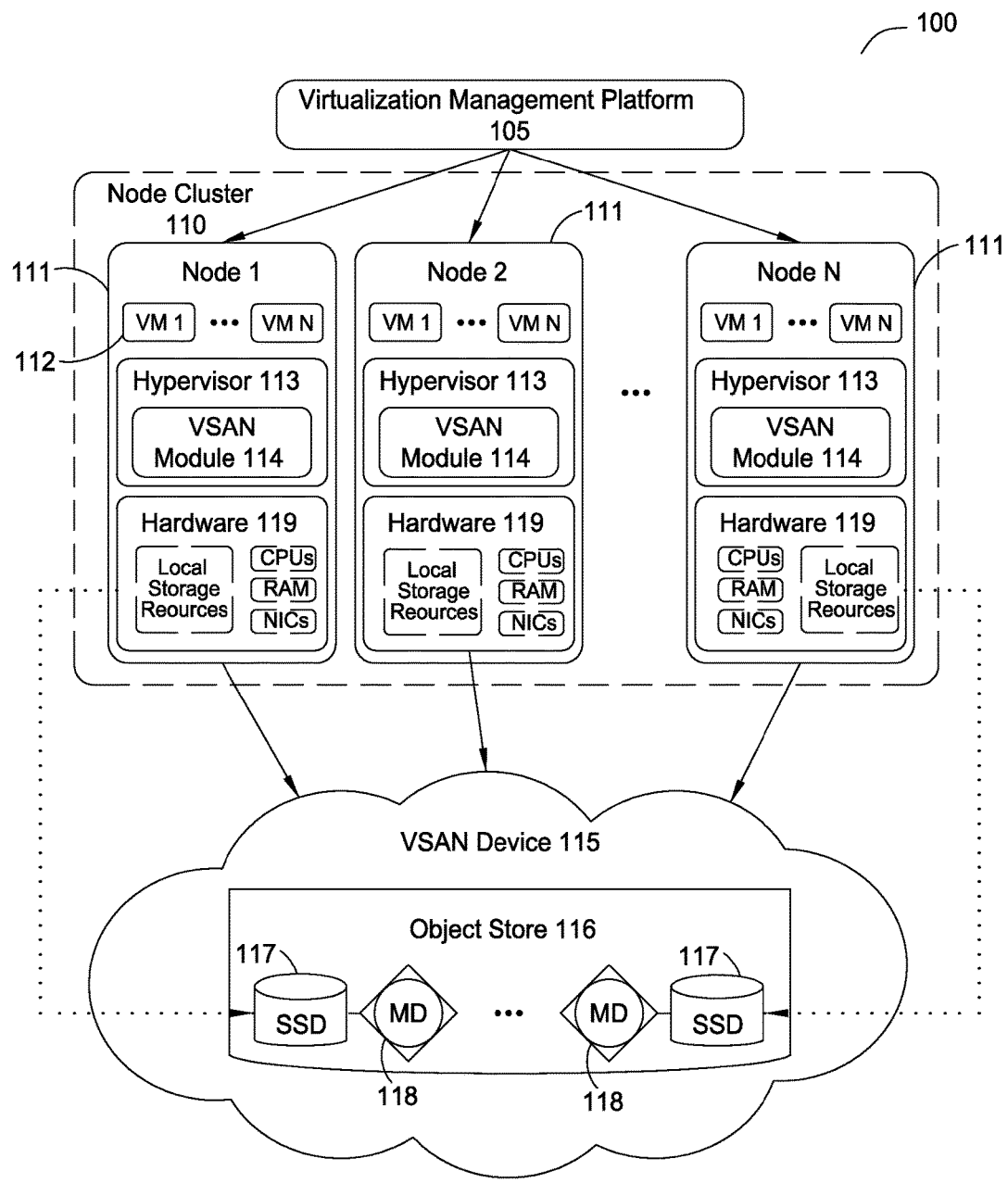
FIG. 1 illustrates an example computing environment, according to one embodiment.

Embodiments presented herein provide techniques for managing a log-structured storage device format, in particular log-structured SSD format, in a distributed storage system. Some distributed storage systems use SSDs as a front-end read cache and write buffer for attached magnetic disks that provide storage (e.g., for a virtual machine). Such systems may maintain, on the SSD, a journal of logical changes to storage objects to persist prepared and committed changes. Entries to the journal may include metadata entries describing the changes in addition to data page entries. In one embodiment, to reduce overhead and write amplification, a distributed storage module maintains an index and allocation map of the journal in dense and in-memory data structures. As entries are added to the journal, index and allocation data are stored in the data structures. Further, in the event that the distributed storage system reboots, the distributed storage module may rebuild the index and allocation map structures.

One example of an applicable distributed storage system that may manage such a format is a software-based virtualized storage area network (VSAN) deployed in a virtualization environment, where host computers in the network cluster act as nodes that launch and run virtual machines. A software-based VSAN uses commodity hardware of the clustered host servers to provide object storage to virtual machines in the cluster by aggregating local disks in the cluster and automating storage management workflows based on predefined policies through an application residing in each host server. The storage objects may store virtual machine (VM) states such as virtual disks, metadata, VM swap files, and the like. In the example VSAN environment, a host computer may host guest storage clients (virtual machines in this example) and resources. In addition, a virtual machine may use resources on the host computer on which it has been launched as well as other host computers in the virtualization cluster.

Further, in the example VSAN environment, storage object components comprise disk groups that each include a solid state drive (SSD) and one or more magnetic disks. Generally, the SSD serves as a front-end read buffer and write cache for the magnetic disks that store object data. Each SSD in the VSAN environment stores a journal of logical changes to persist prepared and committed changes. In one embodiment, the journal includes zero or more data pages per entry and a metadata entry that describes the change. Generally, metadata entries may be combined in metadata blocks for multiple in-flight concurrent requests. Rather than storing an index and allocation map of the metadata on a disk group SSD, the VSAN maintains, in the memory of each node, dense data structures for both the metadata index and the allocation map. Because the data structures are maintained in memory (and not on disk), the VSAN is able to minimize write amplification across disks in the virtualization cluster (for instance, by not performing as many on-disk write operations).

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One of skill in the art will readily recognize from the following description that alternative embodiments of the structures and methods illustrated herein may be employed without departing from the principles described herein.

In the following, an example of a software-defined storage area network in a virtualized computing environment is used as a reference example of log-based storage management in a distributed resources system. This reference example is included to provide an understanding of the embodiments described herein. However, it will be apparent to one of skill in the art that these embodiments are applicable in other contexts related to log-based storage management outside of the virtualization environment.

Similarly, numerous specific details are provided to provide a thorough understanding of the embodiments. One of skill in the art will recognize that the embodiments may be practiced without some of these specific details. In other instances, well known process operations and implementation details have not been described in detail to avoid unnecessary obscuring novel aspects of the disclosure.

FIG. 1 illustrates a computing environment 100, according to one embodiment. As shown, computing environment 100 is a VSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. A file system object (e.g., /vsan/fs_name1, etc.) that is accessible through VSAN 115 may, for example, be implemented to emulate the semantics of a particular file system such as VMware's distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. As further discussed below, each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a distributed object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
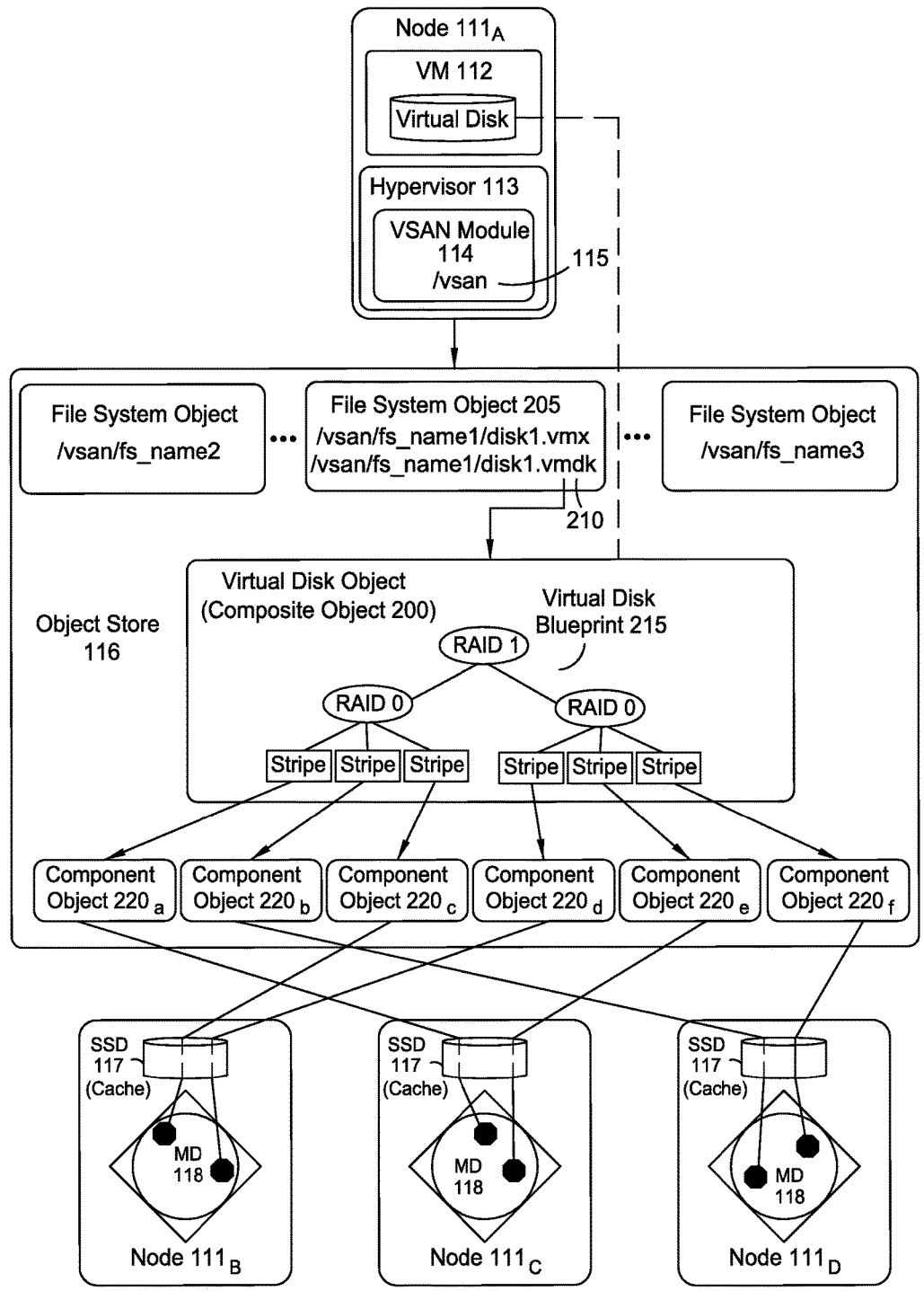
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPS, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., magnetic disks 118, etc.) that actually store the stripe (as well as the location of the stripe within such physical resource).

Each SSD 117 stores a journal for the disks in the corresponding disk group (i.e., for the SSD 117 itself and underlying magnetic disks 118). Each journal maintains entries of logical changes to component objects $220_x$ to persist prepared and committed changes in the latency path. Further, each journal may include data pages per entry and a metadata entry that describes the changes and references the data pages. To minimize the amount of metadata write operations, SSD 117 performs the metadata operations in one stream. For example, generally, given three write operations to each of five disks in the disk group (e.g., for redundancy), typically the data blocks are stored on a SSD 117, once the data blocks are on the disk, the metadata pointing to the blocks are recorded. In addition, VSAN module 114 may perform the write operations in a batch and record the metadata for each operation in a single SSD metadata block, reducing the amount of overall I/O operations. In addition, SSD 117 includes a read cache. The read cache may be managed as in-memory in a table that provides information of what resides in each cache line of the cache. The write buffer of SSD 117 includes several pages for data as well as metadata entries that reference the data pages.

Figure 3:
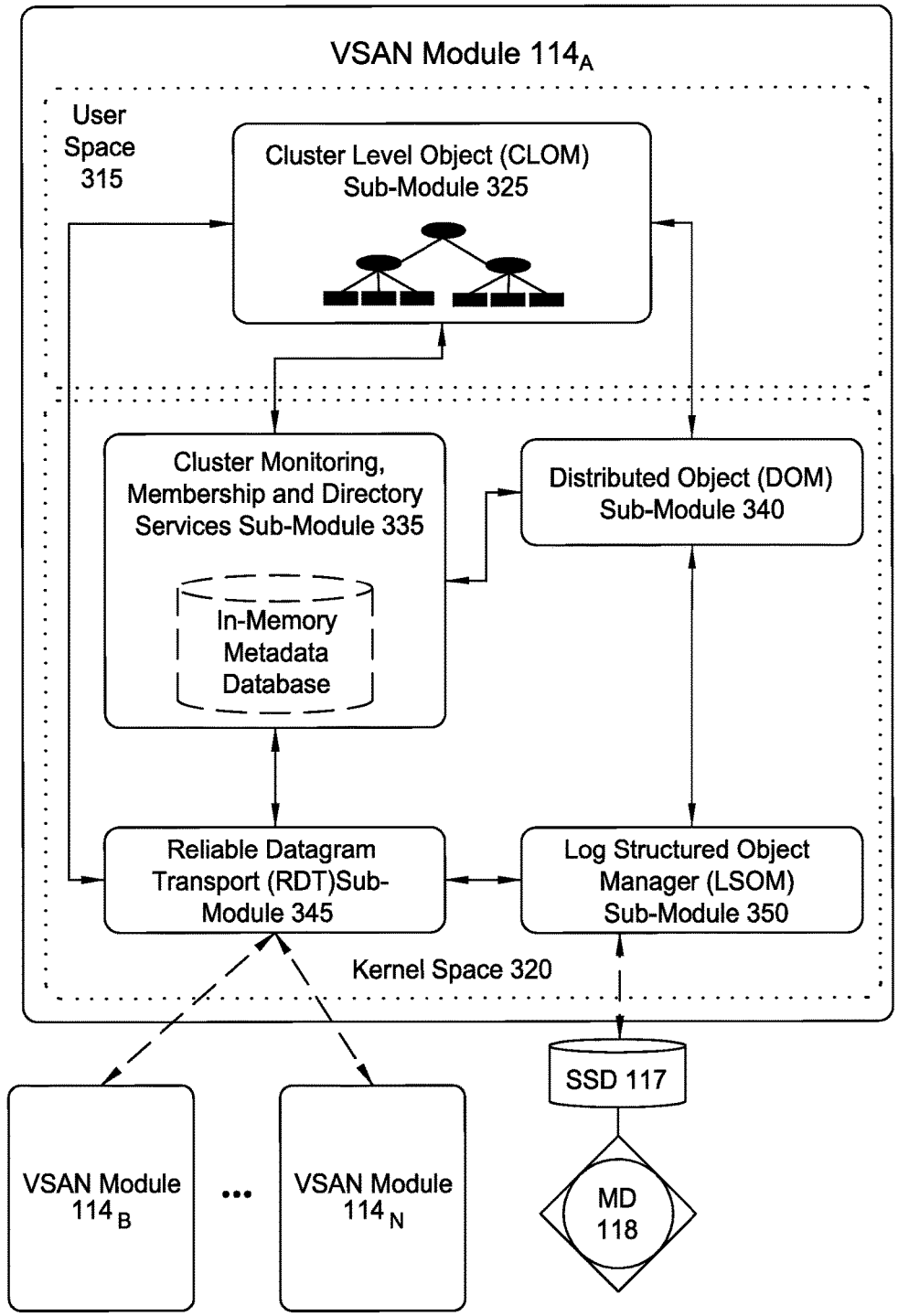
FIG. 3 illustrates components of a VSAN module, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/ stripes of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
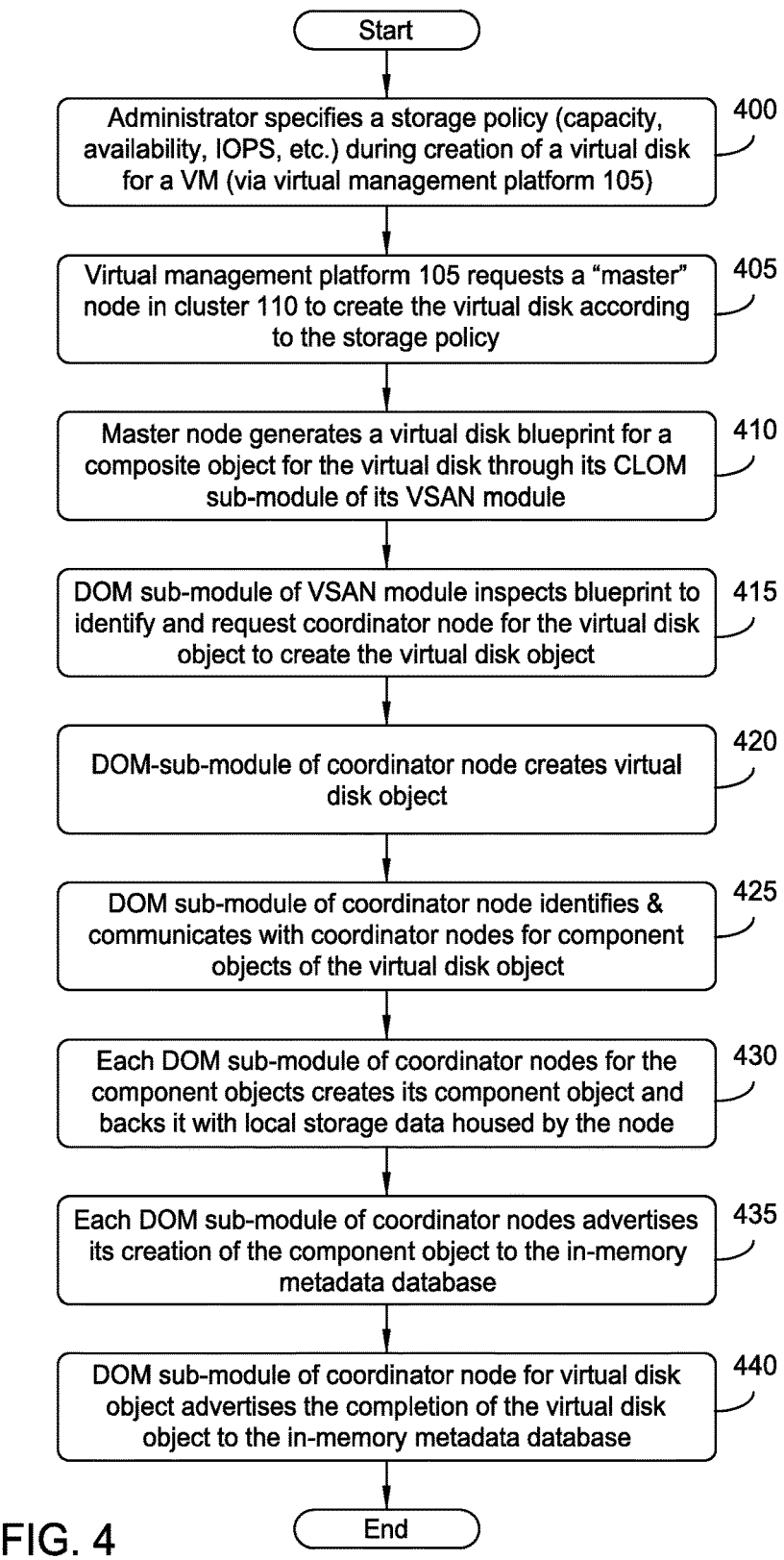
FIG. 4 illustrates a method flow diagram for creating a virtual disk object based on a defined storage policy, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMDS sub-module 335. The virtual disk blueprint may identify a particular node that should serve as the coordinator or owner of the virtual disk object. In step 415, the DOM sub-module 340 of the master node 111 may request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMDS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
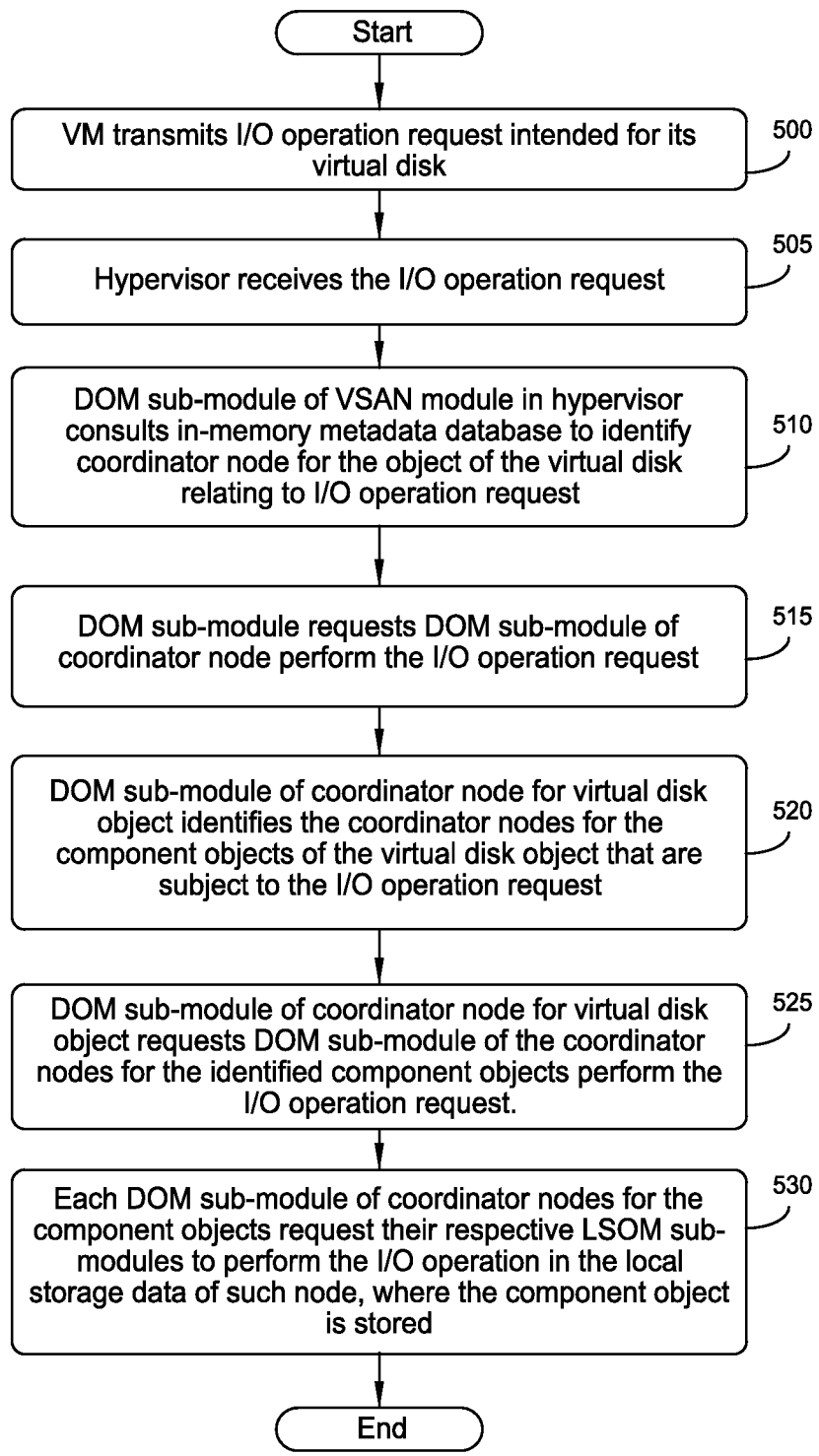
FIG. 5 illustrates the handling of an I/O operation originating from a VM, according to one embodiment.

FIG. 5 illustrates the handling of an I/O operation originating from a VM, according to one embodiment. When a VM running on a particular node performs I/O operations to its virtual disk, the VM's guest operating system, in step 500, transmits an I/O operation request intended for its virtual disk (through a device driver of the guest operating system) which, in step 505, is received by hypervisor 113 and ultimately transmitted and transformed through various layers of an I/O stack in hypervisor 113 to DOM sub-module 340 of VSAN module 114. In step 510, the I/O request received by DOM sub-module 340 includes a unique identifier for an object representing the virtual disk that DOM sub-module 340 uses to identify the coordinator node of the virtual disk object by accessing the in-memory metadata database of CMMDS sub-module 335 (in certain embodiments, accessing the in-memory metadata database to look up a mapping of the identity of the coordinator node to the unique identifier occurs only when the virtual disk object is initially accessed, with such mapping persisting for future I/O operations such that subsequent lookups are not needed). Upon identifying the coordinator node for the virtual disk object, the DOM sub-module 340 of the node running the VM communicates (e.g., using its RDT sub-module 345) with the DOM sub-module 340 of the coordinator node to request that it perform the I/O operation in step 515. As previously discussed, in certain embodiments, if the node running the VM and the node serving as coordinator of the virtual disk object are different, the two DOM sub-modules will communicate to update the role of the coordinator of the virtual disk object to be the node of the running VM. Upon the coordinator's receipt of the I/O request, in step 520, its DOM sub-module identifies (e.g., by again referencing the in-memory metadata database, in certain embodiments) those coordinator nodes for the particular component objects (e.g., stripes) of the virtual disk object that are subject to the I/O operation. For example, if the I/O operation spans multiple stripes (e.g., multiple component objects) of a RAID 0 configuration, DOM sub-module 340 may split the I/O operation and appropriately transmit correspond I/O requests to the respective coordinate nodes for the relevant component objects that correspond to the two stripes. In step 525, the DOM sub-module of the coordinator node for the virtual disk object requests that the DOM sub-modules for the coordinator nodes of the identified component objects perform the I/O operation request and, in step 530, the DOM sub-modules of such coordinator nodes for the identified component objects interact with their corresponding LSOM sub-modules to perform the I/O operation in the local storage resource where the component object is stored.

In certain situations, it should be recognized that multiple clients (e.g., other VSAN modules 114 acting on behalf of running VMs) may simultaneously send requests to perform I/O operations on a particular local storage resource located in a particular node at any given time. For example, the component objects (e.g., stripes, etc.) of different virtual disk objects corresponding to different VMs may be backed by the same local storage on the same node. Upon receiving an I/O operation, the VSAN module 114 of such a node may place the I/O operation into a storage resource queue for processing. To reduce the possibility of congestion or overflow in the I/O queue for the local storage resource caused, for example, by multiple clients accessing component objects, the VSAN module 114 (via its LSOM sub-module, as previously discussed) monitors usage of the local storage resource and may issue a congestion metric to the clients attempting to access the local storage. The congestion metric, discussed in greater detail below, provides a measure by which a client may calculate a delay prior to sending additional I/O requests to the local storage resource.

Figure 6:
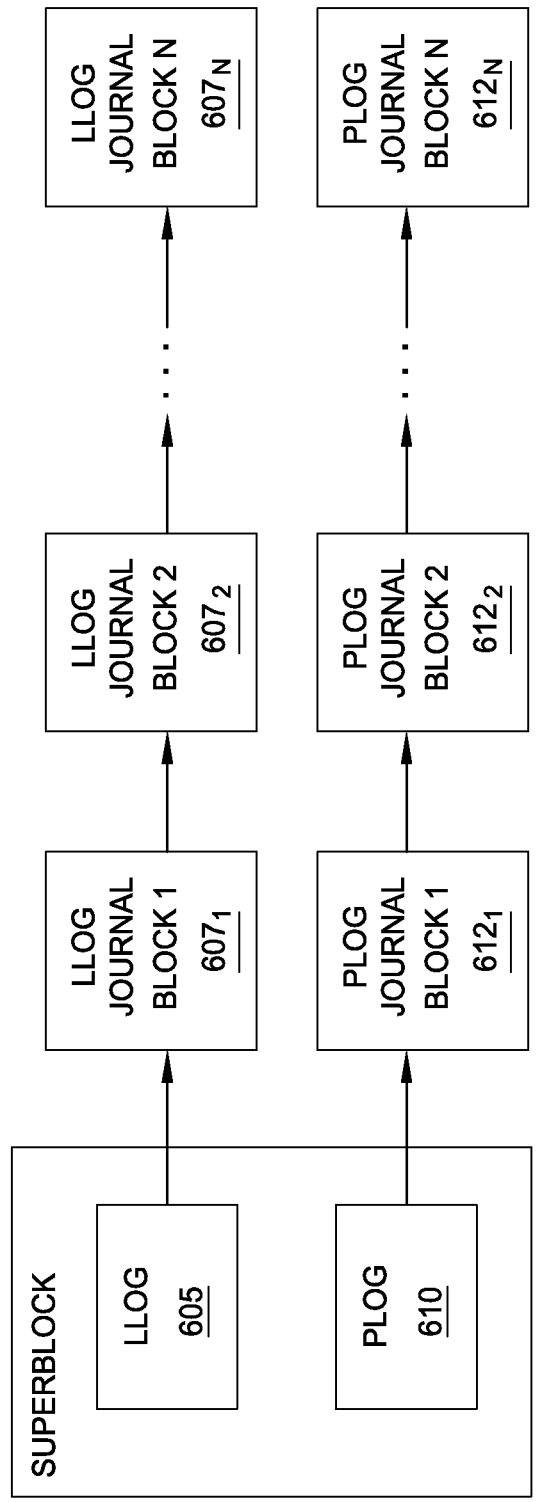
FIG. 6 illustrates a journal superblock in a solid state drive having a logical log and a physical log, according to one embodiment.

FIG. 6 illustrates a journal superblock on a SSD 117 having a logical log (LLOG) 605 and a physical log (PLOG) 610, according to one embodiment. LLOG 605 participates in distributed transactions in the VSAN through commit protocols (e.g., one-and-a-half phase commit, two phase commit, etc.). PLOG 610 serves as the SSD write buffer for the attached magnetic disks, in effect constructing a hybrid drive having flash memory as a front-end to a magnetic disk.

As shown, LLOG 605 and PLOG 610 have pointers to separate journal block chains. Illustratively, LLOG 605 points to a sequence of LLOG journal blocks 607$_{1-N}$, and PLOG 610 points to a sequence of PLOG journal blocks 612$_{1-N}$. In general, each block 607 or 612 in the chain points to the next block 607 or 612, respectively. That is, when the VSAN module writes a block, the VSAN module also allocates a pointer to a new block. By allocating pointers to successive blocks, the VSAN module may pipeline read operations in the event of recovery. Each journal block 607 or 612 includes metadata records as well as delimiters indicating a block size. The metadata records indicate the object to which a given record applies, an offset, the length of data to be written, and an array of SSD block addresses where the data resides on the SSD.

Figure 7:
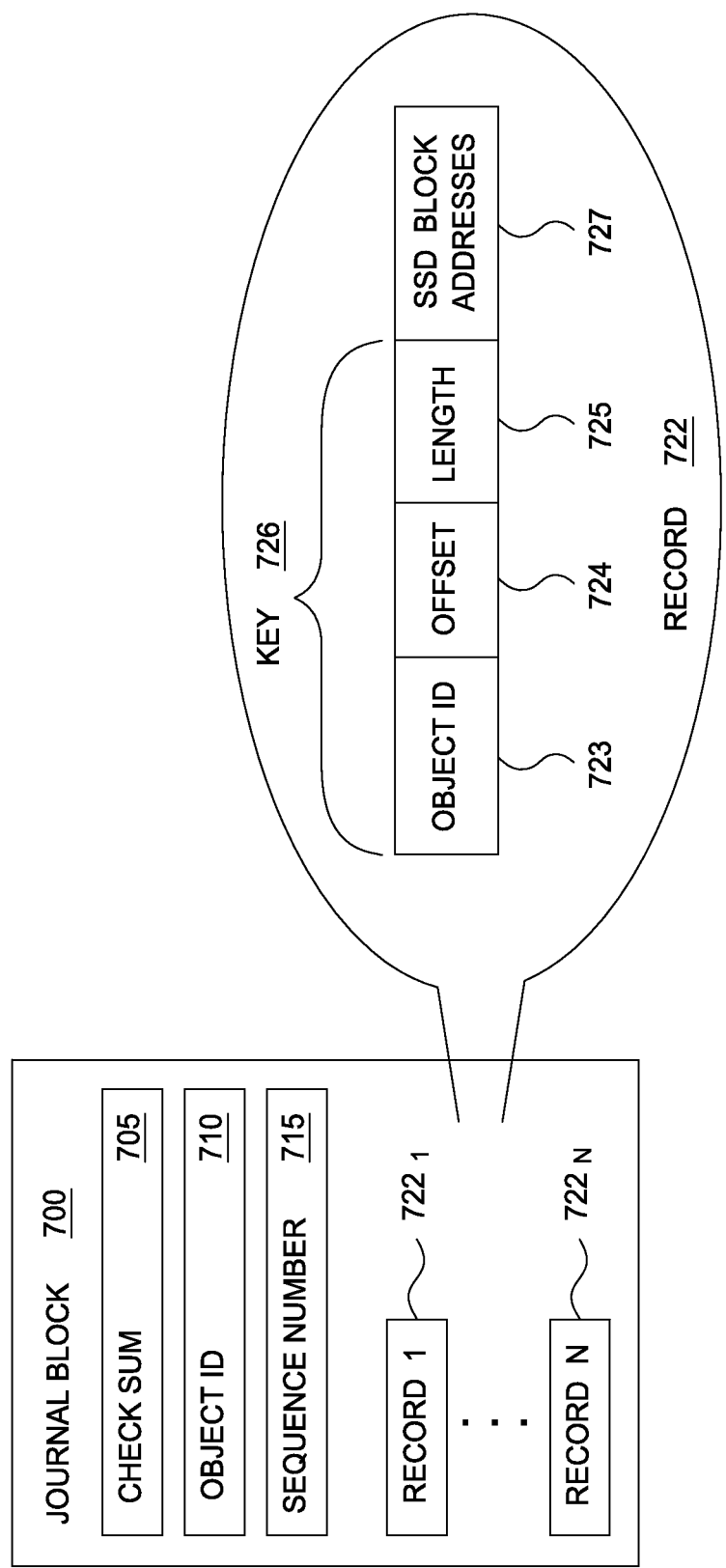
FIG. 7 illustrates an example journal block, according to one embodiment.

FIG. 7 illustrates an example journal block 700, according to one embodiment. Journal block 700 includes a header that includes a checksum 705, an object ID 710, and a sequence number 715. Checksum 705 protects the integrity of journal block 700. In one embodiment, checksum 705 is an MD5 hash. In addition, checksum 705 indicates the end of the chain of block entries for an LLOG and the PLOG. A journal block 700 with a checksum that does not hash into a valid value represents the last journal block 700 in the chain. Object ID 710 provides information about whether journal block 700 belongs to the LLOG or the PLOG. Object ID 710 may also provide information about the corresponding component object belonging to journal block 700. Sequence number 715 is a monotonically incrementing number that allows the VSAN module to identify the order of journal block 700 in a sequence of block entries for a particular object. Generally, sequence number 715 is reasonably large (e.g., approximately a 64-bit value) to prevent a rollover in numbers regardless of the length of the sequence.

As stated, a journal block 700 may include metadata records 722$_{1-N}$. Each record 722 is stored as a key-value pair, where key 726 includes an object ID 723, an offset 724, and a length 725. The object ID 723 portion of record 722 may provide a universally unique identifier corresponding to an associated composite object and a log sequence number. Additionally, object ID 724 may also provide an operation type. For example, if journal block 700 corresponds to a LLOG block, operation types may include prepare and commit transactions for data and metadata write operations. If journal block 700 corresponds to a PLOG block, operation types may include commit transactions for write operations. Offset 724 indicates where on the block to start writing data. Length 725 provides the overall length for the given block. As shown, the payload of the key-value pair of record 722 is a set of SSD block addresses 727 that indicate the block addresses on the SSD that record 722 references.

Further, an allocation bitmap provides bit-level information of available blocks for the LLOG and the PLOG. The VSAN module does not maintain the allocation bitmap on the SSD, but rather in-memory. In one embodiment, the allocation bitmap provides the information at bit-level for reasonably small pages, such as for a 4K block of data. This allows a SSD to more efficiently perform I/O operations. In addition, when a journal block 500 is added into either the LLOG or PLOG, records 722 of journal block 700 are also added to a logical block addressing (LBA) table that corresponds to the journal and transaction type. A LBA table is a key-value store that maintains in-memory versions of record 722 and specifies the location of blocks of data. In one embodiment, separate LBA tables store in-memory records for LLOG prepared entries, LLOG committed entries, and PLOG committed entries. As the VSAN module inserts entries into each journal, the VSAN module also inserts the records to the respective LBA tables. The LBA table also identifies which committed entries to retire to magnetic disks, (i.e., from LLOG to PLOG, and from PLOG to disk).

Further, the VSAN module uses the LBA table when performing read operations. For example, if a certain block has been overwritten, the VSAN module may refer to the corresponding LBA table to determine whether a record corresponding to the block is on the SSD. If an entry exists on the LBA table, then the VSAN module can read from the SSD. If the entry does not exist, the VSAN module reads data from the magnetic disk instead.

Figure 8:
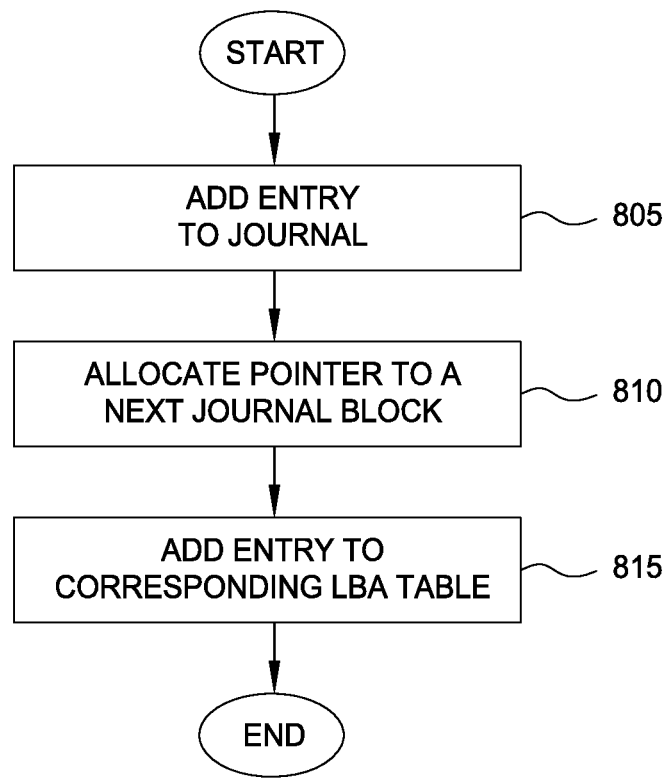
FIG. 8 illustrates a method for building a logical block addressing table corresponding to entries in a journal in a solid state drive, according to one embodiment.

FIG. 8 illustrates a method 800 for building a LBA table corresponding to entries in a SSD journal, according to one embodiment. As stated, when the VSAN module 114 adds change entries into a journal (e.g., the LLOG or the PLOG), the VSAN also inserts the entries into the corresponding LBA table located in-memory. Maintaining the LBA table in-memory, rather than on disk, allows the VSAN module to refer to metadata records more quickly during I/O operations, which results in a reduced amount of write amplification.

In step 805, the VSAN module 114, through its LSOM sub-module 350, adds an entry to a journal to which the entry corresponds. For example, entries corresponding to prepare and commit phase distributed transactions correspond to an LLOG entry. Other entries pertaining to the physical disk correspond to a PLOG entry. At step 805, LSOM sub-module 350 inserts the entry into the corresponding journal. At step 810, LSOM sub-module 350 allocates a pointer to the next journal block. Doing so provides pipelining with read operations.

At step 815, LSOM sub-module adds the entry to a corresponding LBA table. If the entry corresponds to an overwritten entry, the LSOM sub-module 350 removes the overwritten entry at arrival time. For example, if the entry corresponds to an overwrite of the block, VSAN module 114 discards the overwritten entry, which may result in splitting an existing entry into multiple entries. For example, assume that the VSAN performs a write operation on blocks 10 through 20. This is entered into the LBA table. Further, assume that the VSAN module performs a second write operation on blocks 15-18. As a result, the blocks 15-18 portion is removed from the LBA table, effectively creating three entries on the table that point to the corresponding blocks on the SSD: entries for blocks 10-15 (of length 5), blocks 15-18 (of length 3), and blocks 18-20 (for length 2).

As the VSAN module retires data from the SSD to the magnetic disks, the VSAN module also removes entries from the LBA tables. When the LLOG delivers writes to PLOG (e.g., one committed write entry from the LLOG to the PLOG), the LLOG discards the reference to the data block. When the PLOG writes the information to magnetic disks, the PLOG discards the reference. This also results in the allocation bitmap having two bits corresponding to an LLOG bit and a PLOG bit.

Figure 9:
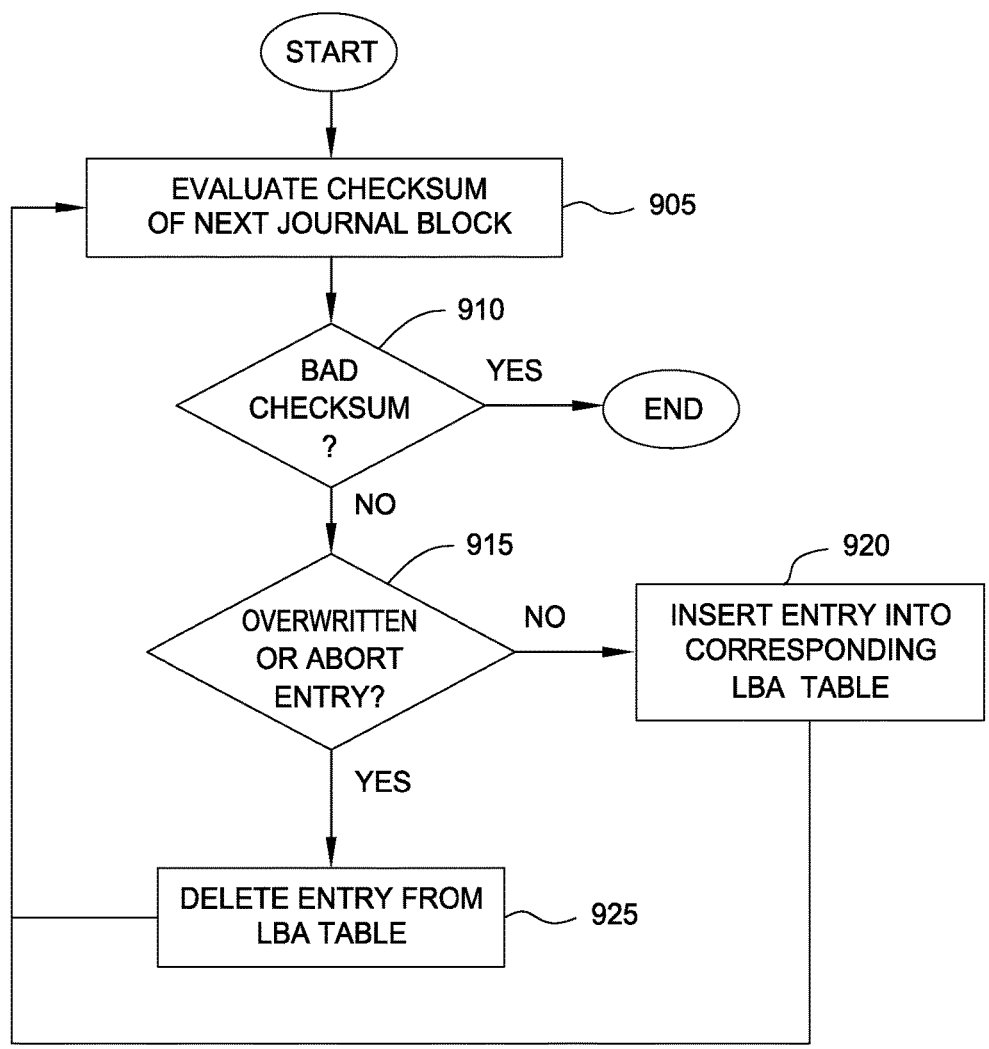
FIG. 9 illustrates a method for rebuilding a logical block addressing table during recovery, according to one embodiment.

FIG. 9 illustrates a method 900 for rebuilding the LBA table during recovery, according to one embodiment. Because the LBA tables and allocation bitmap reside in-memory, the VSAN module 114 rebuilds the LBA table and allocation bitmap upon a restart of the host computer node upon which the disks reside. On restart, the in-memory allocation bitmap indicates that all blocks in the SSD are free, and the LBA tables corresponding to the journals are empty. LSOM sub-module 350 begins at the head pointer of each journal in the SSD superblock and iterates through the each to sequentially insert the entries to the corresponding LBA table.

In step 905, LSOM sub-module 350 evaluates the checksum of the current block of a given journal. The LSOM module determines whether the journal block provides a bad checksum (910). As stated, a bad checksum indicates that LSOM sub-module 350 has reached the end of the block chain. If the checksum is valid, then in step 915, LSOM sub-module 350 evaluates the entry type. If the entry corresponds to a commit transaction, then the LSOM sub-module 350 inserts the entry into the corresponding LBA table, such as the LLOG commit table. In contrast, if the entry corresponds to an overwrite or an abort, in step 925, the LSOM sub-module 114 deletes the entry from the LBA table (if the LSOM sub-module 350 inserted the entry on a previous iteration). The LSOM sub-module 350 continues to iterate through the journal until reaching the end of the block list.

As described, embodiments described herein provide techniques for maintaining a log-structured SSD format in a distributed storage system. Embodiments provide two levels of a journal that records changes to the disk, a logical log and a physical log. The logical log maintains information of distributed transactions on storage object components, and the physical log, in effect, allows the SSD to act as a hybrid disk. By maintaining the metadata LBA tables and allocation map of the journals in-memory and not on disk minimizes the amount of total I/O operations performed on the SSD for data write and metadata write operations, which in turn minimizes overall write amplification. That is, the VSAN module is not required to perform operations on disk to modify metadata with every write operation. And further, this approach allows an SSD to commit many metadata entries into a combined metadata block entry.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. In addition, the various embodiments are described above in the context of SSDs. However, it should be understood that alternative embodiments may be practiced with other types of storage devices having performance characteristics that are similar to that of SSDs.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for populating journal entries in a non-volatile storage device of a distributed resources system comprising a plurality of host computer nodes including a first host computer node and a second host computer node, wherein the non-volatile storage device backs one or more resource objects of the first host computer node and resides in the second host computer node and another non-volatile storage device backs the one or more resource objects of the first host computer node and resides in a third host computer node, the method comprising:
upon an operation occurring on a block of the other non-volatile storage device in the third host computer node, inserting a current entry corresponding to the operation into a journal,
wherein the journal is stored persistently in the non-volatile storage device and maintains entries reflecting logical changes to the one or more resource objects of the first host computer node which are backed by the non-volatile storage device in the second host computer node and the other non-volatile storage device in the third host computer node, and
wherein each entry includes sequence data indicating a sequence of the entry in the journal and a metadata record specifying the logical changes to the one or more resource objects of the first host computer node associated with the operation; and
upon determining a type of the metadata record of the current entry, inserting the metadata record into a datastore corresponding to the journal and the type, wherein the datastore resides in memory of the first host computer node.

2. The method of claim 1, further comprising, upon determining that the current entry corresponds to an overwritten block on the other non-volatile storage device, removing a previous metadata record corresponding to the overwritten block from the datastore.

3. The method of claim 1, wherein the metadata record describes a change to one or more of the logical changes to the one or more resource objects.

4. The method of claim 1, wherein the distributed resources system is a software-based virtual storage area network.

5. The method of claim 1, wherein the type corresponds to a distributed transaction phase of the entry.

6. The method of claim 1, further comprising:
upon detecting that the first host computer node has restarted, iterating through records of each of the plurality of entries;
determining the type of each record; and
inserting each record into the datastore corresponding to the type of each record.

7. The method of claim 6, further comprising, while inserting each record into the datastore, upon determining that a current record corresponds to an overwritten block, removing a previous record corresponding to the overwritten block from the datastore.

8. A non-transitory computer readable storage medium storing instructions, which, when executed on a processor, performs a method for populating journal entries in a non-volatile storage device of a distributed resources system comprising a plurality of host computer nodes including a first host computer node and a second host computer node,
wherein the non-volatile storage device backs one or more resource objects of the first host computer node and resides in the second host computer node and another non-volatile storage device backs the one or more resource objects of the first host computer node and resides in a third computer node, the method comprising:
upon an operation occurring on a block of the other non-volatile storage device in the third host computer node, inserting a current entry corresponding to the operation into a journal,
wherein the journal is stored persistently in the non-volatile storage device and maintains entries reflecting logical changes to the one or more resource objects of the first host computer node which are backed by the non-volatile storage device in the second host computer node and the other non-volatile storage device in the third host computer node, and
wherein each entry includes sequence data indicating a sequence of the entry in the journal and a metadata record specifying the logical changes to the one or more resource objects of the first host computer node associated with the operation; and
upon determining a type of the metadata record of the current entry, inserting the metadata record into a datastore corresponding to the journal and the type, wherein the datastore resides in memory of the first host computer node.

9. The computer-readable storage medium of claim 8, wherein the method further comprises, upon determining that the current entry corresponds to an overwritten block on the other non-volatile storage device, removing a previous metadata record corresponding to the overwritten block from the datastore.

10. The computer-readable storage medium of claim 8, wherein the metadata record describes a change to one or more of the logical changes to the one or more resource objects.

11. The computer-readable storage medium of claim 8, wherein the distributed resources system is a software-based virtual storage area network.

12. The computer-readable storage medium of claim 8, wherein the type corresponds to a distributed transaction phase of the entry.

13. The computer-readable storage medium of claim 8, wherein the method further comprises:
upon detecting that the first host computer node has restarted, iterating through records of each of the plurality of entries;
determining the type of each record; and
inserting each record into the datastore corresponding to the type of each record.

14. The computer-readable storage medium of claim 13, wherein the method further comprises, while inserting each record into the datastore, upon determining that a current record corresponds to an overwritten block, removing a previous record corresponding to the overwritten block from the datastore.

15. A system, comprising:
a processor; and
a memory hosting an application, which, when executed on the processor, performs a method for populating journal entries in a non-volatile storage device of a distributed resources system comprising a plurality of host computer nodes including a first host computer node and a second host computer node, wherein the non-volatile storage device backs one or more resource objects of the first host computer node and resides in the second host computer node and another non-volatile storage device backs the one or more resource objects of the first host computer node and resides in a third host computer node, the method comprising:
- upon an operation occurring on a block of the other non-volatile storage device in the third host computer node, inserting a current entry corresponding to the operation into a journal,
- wherein the journal is stored persistently in the non-volatile storage device and maintains entries reflecting logical changes to the one or more resource objects of the first host computer node which are backed by the non-volatile storage device in the second host computer node and the other non-volatile storage device in the third host computer node, and
- wherein each entry includes sequence data indicating a sequence of the entry in the journal and a metadata record specifying the logical changes to the one or more resource objects of the first host computer node associated with the operation; and
- upon determining a type of the metadata record of the current entry, inserting the metadata record into a datastore corresponding to the journal and the type, wherein the datastore resides in memory of the first host computer node.

16. The system of claim 15, wherein the method further comprises, upon determining that the current entry corresponds to an overwritten block on the other non-volatile storage device, removing a previous metadata record corresponding to the overwritten block from the datastore.

17. The system of claim 15, wherein the metadata record describes a change to one or more of the logical changes to the one or more resource objects.

18. The system of claim 15, wherein the distributed resources system is a software-based virtual storage area network.

19. The system of claim 15, wherein the method further comprises:
- upon detecting that the first host computer node has restarted, iterating through records of each of the plurality of entries;
- determining the type of each record; and
- inserting each record into the datastore corresponding to the type of each record.

20. The system of claim 19, wherein the method further comprises, while inserting each record into the datastore, upon determining that a current record corresponds to an overwritten block, removing a previous record corresponding to the overwritten block from the datastore.

* * * * *